(12) United States Patent
Herren

(10) Patent No.: US 9,955,821 B2
(45) Date of Patent: May 1, 2018

(54) DISK GRATER

(71) Applicant: SWIZZZCUT AG, Beckenried (CH)

(72) Inventor: Bruno Herren, Beckenried (CH)

(73) Assignee: swizzzCut AG, Beckenried (CH)

( * ) Notice: Subject to any disclaimer, the term of this patent is extended or adjusted under 35 U.S.C. 154(b) by 420 days.

(21) Appl. No.: 14/414,374

(22) PCT Filed: Jul. 11, 2013

(86) PCT No.: PCT/EP2013/064664
§ 371 (c)(1),
(2) Date: Jan. 12, 2015

(87) PCT Pub. No.: WO2014/009460
PCT Pub. Date: Jan. 16, 2014

(65) Prior Publication Data
US 2015/0144722 A1 May 28, 2015

(30) Foreign Application Priority Data
Jul. 12, 2012 (CH) ........................................ 1076/12

(51) Int. Cl.
*A47J 43/00* (2006.01)
*A47J 43/08* (2006.01)
*A47J 43/25* (2006.01)

(52) U.S. Cl.
CPC ........... *A47J 43/085* (2013.01); *A47J 43/082* (2013.01); *A47J 43/255* (2013.01)

(58) Field of Classification Search
CPC ....... A47J 43/085; A47J 43/082; A47J 43/255
USPC .................................................. 241/37.5, 92
See application file for complete search history.

(56) References Cited

U.S. PATENT DOCUMENTS

| | | | | | |
|---|---|---|---|---|---|
| 3,892,365 | A | * | 7/1975 | Verdun | A47J 43/06 241/282.1 |
| 4,209,916 | A | * | 7/1980 | Doyel | A47J 43/24 210/360.1 |
| 5,156,084 | A | * | 10/1992 | Lin | A47J 43/06 210/380.1 |
| 6,035,771 | A | * | 3/2000 | Conran | A47J 43/082 241/199.12 |
| 7,028,930 | B2 | * | 4/2006 | Carnevale | F16P 3/08 241/278.1 |

(Continued)

FOREIGN PATENT DOCUMENTS

CN           1235526 A     11/1999
CN       101478907 A      7/2009

(Continued)

OTHER PUBLICATIONS

US 6,986,477, 01/2006, Holcomb et al. (withdrawn)
Co-pending U.S. Appl. No. 14/414,381, Bruno Herren, Titled: Disk Grater, filed Jan. 12, 2015.

*Primary Examiner* — Faye Francis
(74) *Attorney, Agent, or Firm* — Pauley Erickson & Kottis

(57) ABSTRACT

The invention relates to a device for processing foodstuffs, including an upper part, a drive and a lower part and a working unit that can be driven and set rotating by means of the drive, the drive being a manually cord-operated drive and the device having a holding-operating element on the upper part. The upper part of the device has an opening and is designed to feed the foodstuff to be processed to the working unit and to hold the device in position.

17 Claims, 4 Drawing Sheets

(56) References Cited

U.S. PATENT DOCUMENTS

Figure 1:
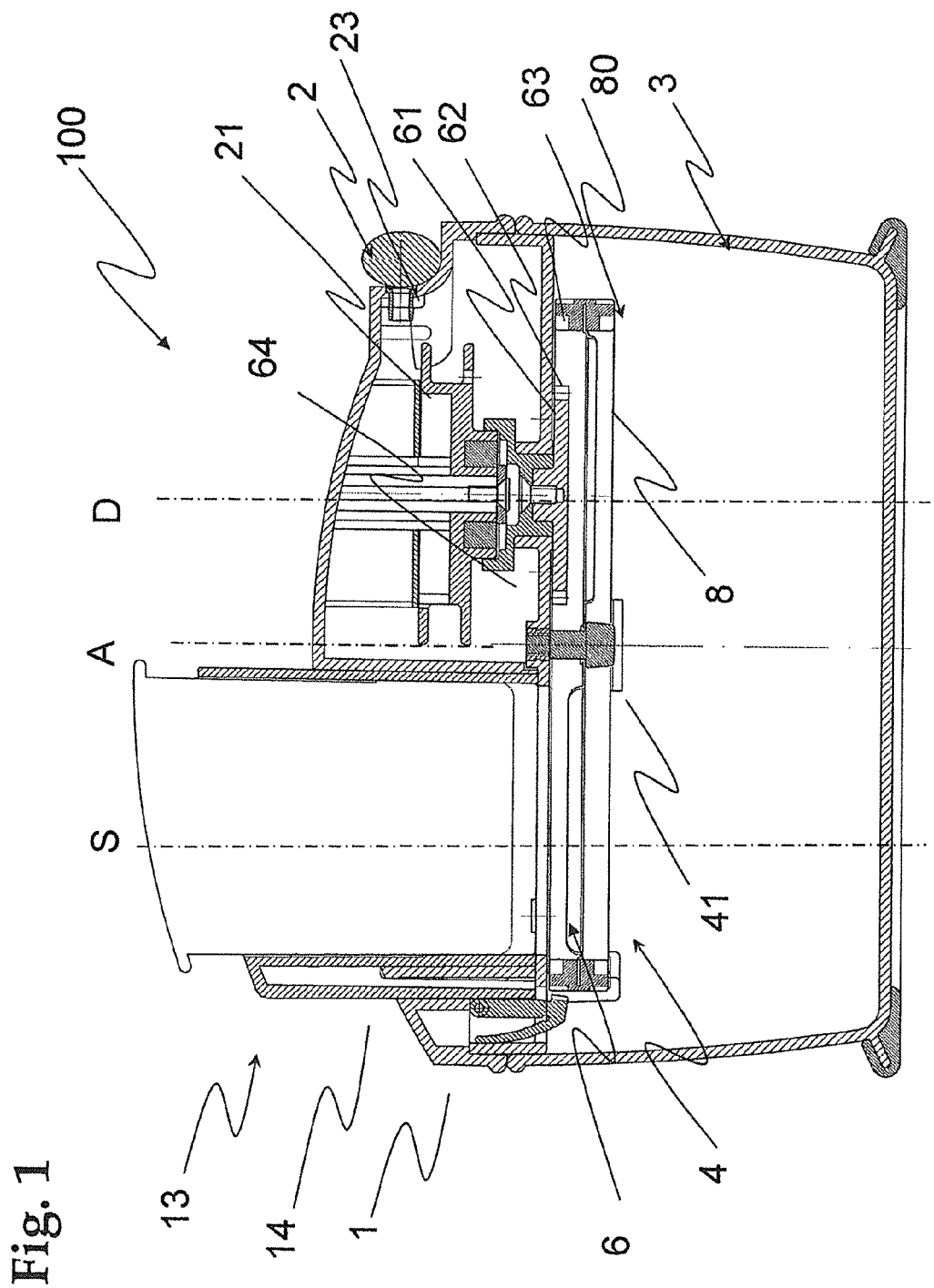

| | | | | |
|---|---|---|---|---|
| 7,059,553 B2* | 6/2006 | Mueller | ............... | A47J 43/1068 241/168 |
| 7,069,839 B2* | 7/2006 | Kernan | ............... | A47J 43/0777 241/37.5 |
| 7,264,189 B2* | 9/2007 | Holcomb | ................ | A47J 17/02 241/101.1 |
| 7,422,169 B2* | 9/2008 | Mueller | ............... | A47J 43/1068 241/168 |
| 7,669,793 B2* | 3/2010 | So | ........................ | A47J 43/044 241/169.1 |
| 7,673,829 B2* | 3/2010 | Holcomb | ................ | A47J 43/07 241/282.2 |
| 7,686,240 B2* | 3/2010 | Pryor, Jr. | ............ | A47J 43/0716 241/282.1 |
| 7,762,487 B2* | 7/2010 | Cheung | ............... | A47J 43/1025 241/169.1 |
| 7,905,438 B2* | 3/2011 | Holcomb | ................ | A47J 43/07 241/282.2 |
| 8,122,820 B2* | 2/2012 | Conti | ................ | A47J 43/0711 241/101.01 |
| 8,220,730 B2* | 7/2012 | Ferraby | ............... | A47J 43/0794 200/331 |
| 8,387,520 B2* | 3/2013 | Backus | ................ | A47J 19/027 241/37.5 |
| 8,677,895 B2* | 3/2014 | Beber | ................ | A47J 43/0711 241/101.1 |
| 8,695,490 B2* | 4/2014 | Harris | ................ | A47J 43/1031 74/125.5 |
| 9,591,949 B2* | 3/2017 | Merl | ................ | A47J 43/0705 |
| 2002/0153440 A1* | 10/2002 | Holcomb | ............... | A47J 17/02 241/169.1 |
| 2003/0205635 A1* | 11/2003 | Lazzer | ................. | F16P 3/08 241/37.5 |
| 2004/0251342 A1* | 12/2004 | Wanat | ................ | A47J 43/0794 241/37.5 |
| 2008/0164357 A1 | 7/2008 | Chau et al. | | |
| 2009/0114104 A1 | 5/2009 | Sawhney et al. | | |
| 2009/0320696 A1* | 12/2009 | Herren | ................ | A47J 43/105 99/493 |
| 2011/0226140 A1 | 9/2011 | Herren | | |
| 2014/0203127 A1* | 7/2014 | Merl | ................ | A47J 43/0705 241/100 |

FOREIGN PATENT DOCUMENTS

| | | |
|---|---|---|
| DE | 20 2007 017012 U1 | 4/2008 |
| GB | 2 327 864 A | 2/1999 |
| WO | WO 2007/128154 A1 | 11/2007 |

* cited by examiner

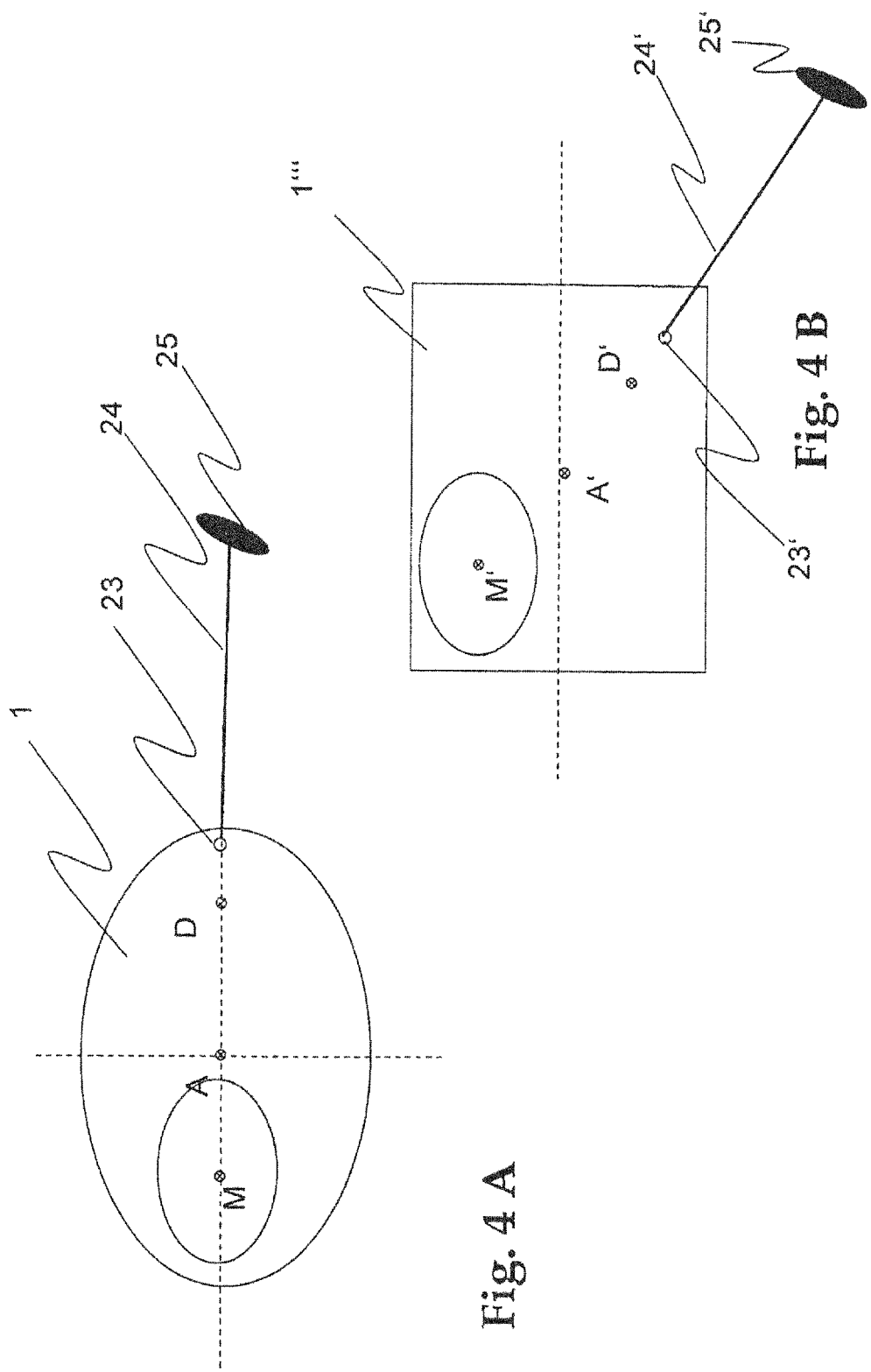

DISK GRATER

BACKGROUND OF THE INVENTION

Field of the Invention

The invention relates to a manually operated apparatus for cutting-to-shape foodstuffs.

Discussion of Related Art

The prior art discloses a multiplicity of disk mincers or disk graters which are, for example, either sold as individual apparatuses or as additional apparatuses for kitchen machines. Such disk graters today are typically operated electrically. They dispose of an infeed duct for the vegetables to be comminuted, a connector by way of which the vegetables are pushed into the infeed duct and which simultaneously also serves as protection against cutting, and an electric drive for the cutting disk. The cutting disks may be correspondingly exchanged, depending on the desired cutting result. As an example of a multiplicity of electric disk graters, the electric grater OPTUS Z1 by the OPTUS Company should be mentioned at this point. The prior art likewise discloses manually operated apparatuses which dispose of a crank drive. In the case of the crank drives, it is disadvantageous that the cutting disk can often be driven having only low torque and only significantly fewer revolutions can be achieved as compared with an electric drive. As a consequence, only modest results can be achieved in the case of hard or fibrous cutting goods. The cutting goods are either entrained by the blades of the cutting disk and not cut, or else blocking of the cutting disk and squashing of the cutting goods takes place.

SUMMARY OF THE INVENTION

Proceeding from the known electrically operated disk graters, the object lies in providing an apparatus which does not have the disadvantages mentioned earlier.

In the following, the term disk grater is also understood to include a disk mincer.

One problem which arises when developing a manually operated disk grater is that in the case of the simultaneous manual operation of a cord-pull drive using one hand, the apparatus has to be held with the other hand and the foodstuff to be cut likewise has to be infed using that hand. During grating, the apparatus is exposed to two main force components, one being a compressive force by way of which the foodstuff is infed to the apparatus and by way of which the apparatus is held, and a tensile force by way of which the operator activates the cord-pull drive. In order to achieve a good cutting result, it is necessary to ensure that sufficient compressive force and tensile force are applied to the apparatus and that slippage and/or tilting are prevented.

The apparatus according to the invention is distinguished by an upper part, a cord-pull drive, and a lower part, and a working unit which is drivable by means of the cord-pull drive and is able to be set in rotational movement. The apparatus on the upper part has a holding-operating element which comprises an opening in the upper part and which is equipped for infeeding the foodstuff to be processed to the working unit and for holding the apparatus in position. In one preferred embodiment, the opening is encircled by a duct which serves for being able to hold the apparatus in a more stable manner with one hand and which simultaneously forms a filling connector for the foodstuff to be cut. In one advantageous embodiment of the invention, the duct is implemented as a separate part which is able to be placed onto the opening. When the apparatus is not used, the duct may be removed and the apparatus stored in this space-saving manner. The duct which is able to be placed on top furthermore serves as an unlocking element for a locking element. The operator can put the apparatus into operation only once the duct has been placed onto the opening.

In one further embodiment of the invention, the duct is formed in a circumferential region of the opening on an upper side of the upper part.

In one further embodiment of the apparatus according to the invention, the lower part has stabilizing means which are equipped for enlarging a footprint of the lower part.

In order to prevent the operator from being able to operate the cord-pull drive and simultaneously reach into the working means with his/her hand, a locking element which is equipped for blocking the working unit in a non-operational state is provided. In order to set the apparatus in motion, an unlocking element which is equipped for actuating the locking element in order to release the blocking is provided. During blocking, the locking element engages in a braking means, wherein the braking means is part of the working unit. In one embodiment of the invention, the braking means is configured as a toothing, preferably an external toothing. The locking element engages in this toothing. The locking element is configured as a hook-shaped element which is movably mounted, for example. The holding-operating element, in particular the duct, is provided for actuating the locking element. In one embodiment of the invention, the duct which is able to be placed onto the opening serves for releasing the locking element and for unlocking the working means. The locking element latches into the working means when the duct is not placed onto the opening. The duct is configured such that is can be filled with the foodstuff to be cut, for example a cucumber.

According to one further embodiment, the apparatus has a drive wheel having an external toothing and a working unit having an internal toothing, wherein the drive wheel is disposed in such a manner in relation to the working unit that the external toothing of the drive wheel engages in the internal toothing of the working unit and upon actuation of the cord-pull drive sets the working unit in rotational movement. In one preferred embodiment, the working unit comprises a cutting disk or grating disk. The cutting disk furthermore has a support ring which peripherally encircles the cutting disk. In one preferred embodiment, the support ring has an internal toothing and is symmetrically disposed in relation to the cutting disk, wherein the cutting disk represents the plane of symmetry.

In preferred embodiments of the invention, in which the upper part is connected to a container as the lower part, the upper part and the container preferably have a geometry which deviates from the circular shape, for example an elongate shape such as that of an oval, of an ellipse, or of a rectangle. The elongate shape increases the stability under load of the apparatus. When viewed from the holding-operating element, the geometry here extends in that direction in which a tensile force is exerted on the apparatus due to actuation of the cord-pull drive. The elongate shape of the upper part and of the container furthermore has the advantage that the upper part is more secure against rotation in relation to the container.

The apparatus according to the invention may be placed onto various lower parts or be releasably connected to various lower parts. In one preferred embodiment, the lower part is a collection container. Further embodiments, such as for example that of a frame on which the apparatus according to the invention is placed, are conceivable. Alternatively or additionally, the upper part may on its lower side or peripherally also have form-fitting means, by means of which said upper part is able to be placed onto a pot or a bowl of suitable size.

The holding-operating element, which in one preferred embodiment is implemented as a duct, furthermore has a guide means. The guide means is configured in such a manner that in the vertical direction to a footprint of the apparatus it can be guided with an exact fit in the duct. On account of being guided with an exact fit, it is achieved that the holding-operating element can be impinged with a sufficient compressive force. This compressive force which the operator exerts on the holding-operating element is required in order to infeed the foodstuff to the working unit, on the one hand, and in order to stabilize the apparatus in relation to the tensile force which is initiated by means of the cord pull, on the other hand. The guide means and the duct are preferably designed in a shape which deviates from a circular shape, for example in an elliptic or reniform manner. In these preferred embodiments, the guide means cannot be rotated in the duct.

In one preferred embodiment of the apparatus according to the invention, a rotation axis of the cord-pull drive is disposed so as to be spaced in a parallel manner from an imaginary symmetry axis of the holding-operating element and from a central axis of the apparatus.

BRIEF DESCRIPTION OF THE D WINGS

Figure 2:
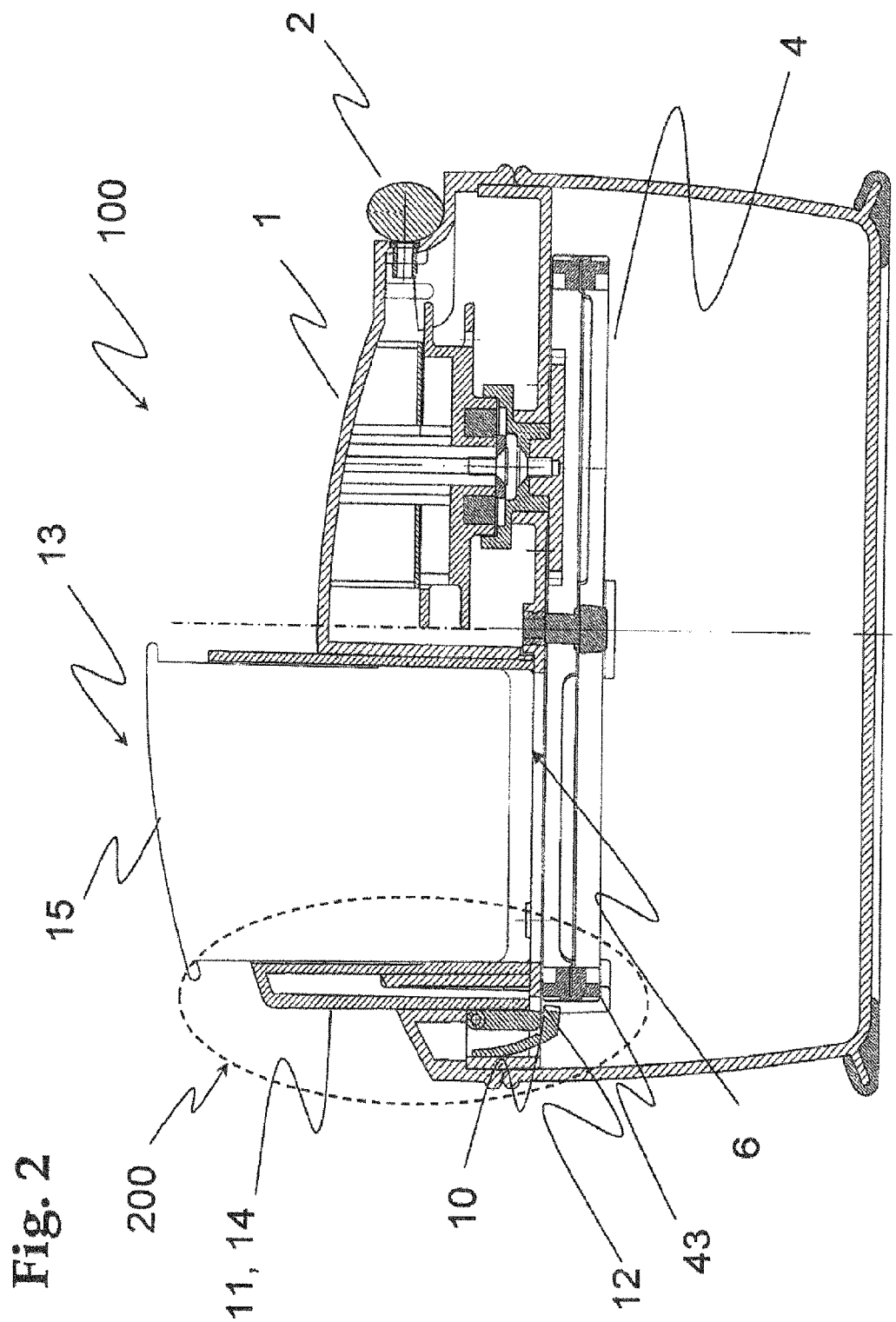
Figure 3:
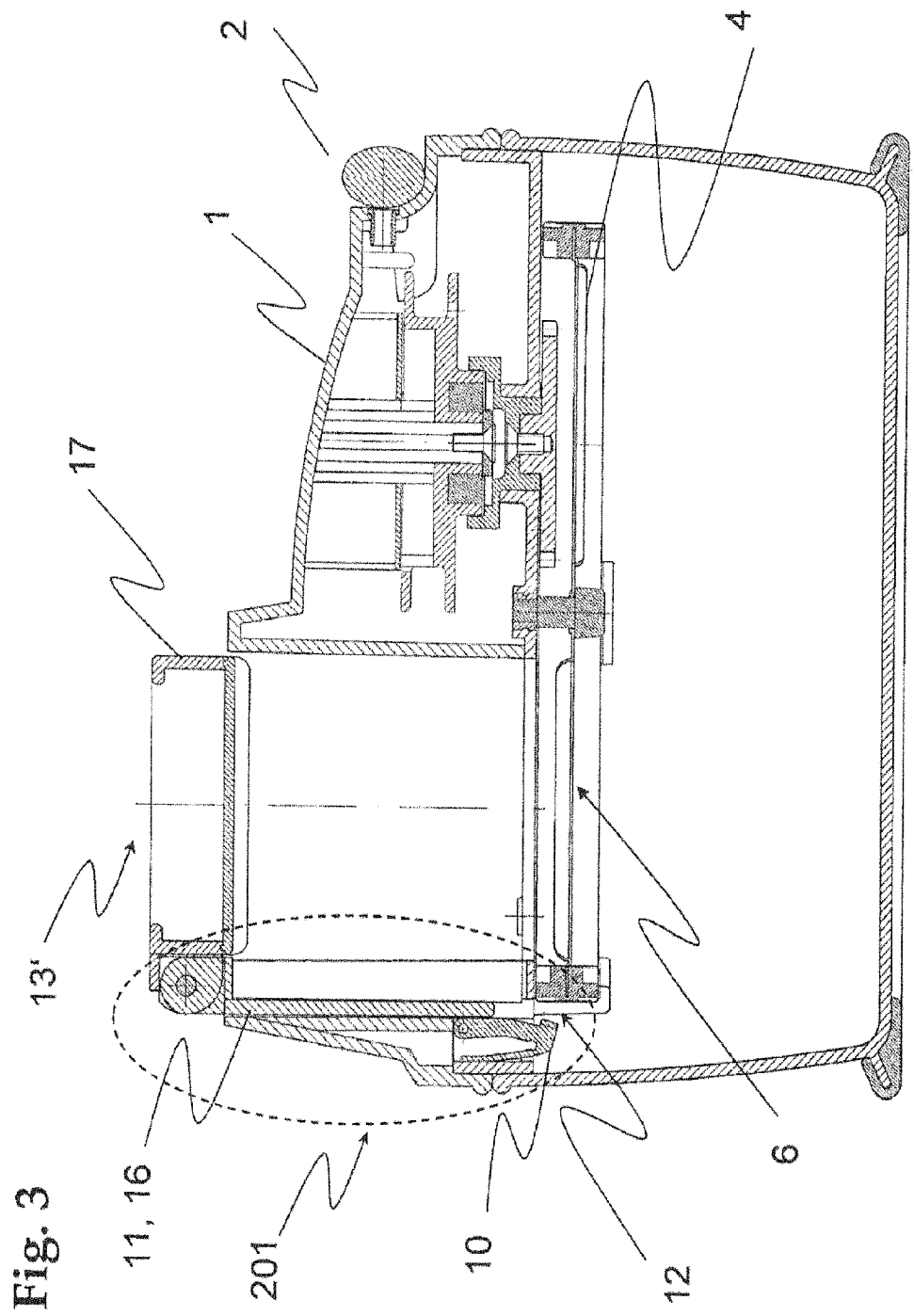

The invention is to be explained in more detail in the following by means of exemplary embodiments in conjunction with the drawing, in which:

FIG. 1 shows a preferred embodiment of the apparatus according to the invention in a sectional illustration, FIG. 2 shows a preferred embodiment of the apparatus having a safety device according to the invention, with a preferred embodiment of an unlocking element, FIG. 3 shows a preferred embodiment of the cutting apparatus having a further safety device according to the invention, with a further preferred embodiment of an unlocking element, FIG. 4A shows an illustration of a potential embodiment of the upper part, in a view from above, with the positioning of the holding-operating element in relation to the exit point of the cord, FIG. 4B shows an illustration of a further potential embodiment of the upper part, in a view from above, with the positioning of the holding-operating element in relation to the exit point of the cord.

DETAILED DESCRIPTION OF THE INVENTION

In FIG. 1a first preferred embodiment of the apparatus 100 according to the invention is illustrated. The apparatus comprises an upper part 1 which is placed onto a lower part 3. The apparatus 100 furthermore disposes of a working unit 4 which preferably represents a cutting disk 8, a holding-operating element 13, and a drive 2. In one preferred embodiment, the drive 2 comprises a cord-pull drive 21.

Here, S represents an imaginary symmetry axis of the holding-operating element 13. The central axis A is that axis which leads through the center of the apparatus according to the invention. The axis D is the rotation axis of the cord-pull drum 21. The terms symmetry axis S, central axis A, and rotation axis D are to be understood as geometric axes.

The rotation axis D of the cord-pull drive 21 runs parallel to the imaginary symmetry axis S of the holding-operating element 13 and to the central axis A of the apparatus 100. In the preferred embodiment of the apparatus, an exit point 23 of a cord of the cord-pull drive 21 is laterally disposed on the upper part 1. The arrangement is designed such that the spacing between the central axis A of the apparatus and the exit point 23 is at a maximum, depending on a geometric shape of the upper part 1.

According to the embodiment of FIG. 1, the drive wheel 61 which has an external toothing 62 is operated by the drive 2, preferably by the cord-pull drive 21. Once the drive wheel 61 has been set in rotational movement, the external toothing 62 of the drive wheel engages in an internal toothing 63 of the working unit 4 and in this manner sets the working unit 4 in rotational movement. In one preferred embodiment of the invention, the central axis A penetrates a bearing element 41 of the working unit 4.

FIG. 2 shows a preferred embodiment of a safety device 200 according to the invention. The safety device comprises an unlocking element 11 and locking element 10. In the preferred embodiment according to FIG. 2, the locking element 10 is configured as a hook-shaped element which is movably mounted and is disposed on the upper part 1 of the apparatus. In the case of the state illustrated in FIG. 2 the safety device is unlocked. The holding-operating element 13, in particular the duct 14, represents the unlocking element 11. The holding-operating element 13 comprises the duct 14 and the pusher 15. The duct 14 is implemented as a separate part and is placed onto the opening 6.

In the case of the unlocking element 11 being removed, the locking element 10 engages in the braking means 12 of the working unit 4 and blocks the latter. When the duct 14 is placed on the upper part 1 of the apparatus 100, the duct 14 unlocks the locking element 10 and the working unit 4 can be set in rotational movement by means of the drive 2.

FIG. 3 shows a further preferred embodiment of the safety device 201 in an unlocked state. In this preferred embodiment, the holding-operating element 13' comprises a slide 16 and a cover element 17.

In one preferred embodiment of the invention, the slide 16 and the cover element 17 can be placed onto the opening 6. The slide 16 unlocks the locking element 10, and the working unit 4 can be set in rotational movement by means of the drive 2.

FIG. 4A shows a preferred arrangement of an exit point 23 of the cord 24 of the cord-pull drive 21. FIG. 4A represents a schematic view of an upper part 1 of an apparatus which is of the same generic type as the apparatus 100 from FIG. 1. The exit point 23 of the cord 24, measured in relation to the geometric shape of the upper part 1, is disposed in such a manner that the spacing between the central axis A of the apparatus and the exit point 23 assumes the largest possible value. The exit point and the imaginary center M of the holding-operating element preferably lie on the longitudinal axis of the apparatus.

FIG. 4B shows a further preferred arrangement of the exit point 23. The upper part 1''' is configured in a rectangular shape. The exit point 23 is again disposed having the largest possible spacing from the penetration point of the central axis A' and on an axis having the imaginary center M' of a cross-sectional area of the holding-operating element.

Both types of arrangement increase the stability under load of the apparatus during operation of the pull-cord mechanism.

The invention claimed is:

1. An apparatus (100) for processing foodstuffs comprising:
   an upper part (1) including an infeed opening (6);
   a drive (2) connected to the upper part (1), wherein the drive (2) is a manually operatable cord-pull drive comprising a drive wheel (61) with an external toothing (62);
   a working unit (4) configured to be set in rotational movement by the drive (2), wherein the infeed opening (6) is configured for infeeding the foodstuffs to be processed to the working unit (4) for cutting the foodstuffs in the upper part (1), wherein the working unit (4) includes an internal toothing (63), the drive wheel (61) is disposed in relation to the working unit (4) so that the external toothing (62) of the drive wheel (61) engages in the internal toothing (63) of the working unit (4), and actuation of the cord-pull drive (21) sets the working unit (4) in rotational movement via the external toothing (62) engaging with the internal toothing (63); and
   a holding-operating element (13) disposed over the infeed opening (6), wherein the holding-operating element includes a duct (14) for infeeding the foodstuffs to the infeed opening (6), and the holding-operating element extends above the upper part (1) for manually holding the apparatus.

2. The apparatus as claimed in claim 1, wherein the duct (14) is placed onto the opening (6) as a separate part or the duct (14) is formed about a circumferential region of the opening (6).

3. The apparatus as claimed in claim 2, further comprising a guide element, wherein the guide element is guidable with an exact fit in the duct (14).

4. The apparatus as claimed in claim 1, further comprising a guide element moveable within the duct (14) for pushing the foodstuffs through the duct to the infeed opening (6).

5. The apparatus as claimed in claim 1, wherein the working unit (4) comprises a cutting disk (8) disposed below the infeed opening (6).

6. The apparatus as claimed in claim 5, wherein the cutting disk (8) comprises a support ring (80) connected to the upper part (1) which peripherally encircles the cutting disk (8), and the support ring (80) includes an internal toothing (63).

7. The apparatus as claimed in claim 6, wherein the support ring (80) is symmetrically disposed in relation to the cutting disk (8), wherein the cutting disk (8) represents the plane of symmetry.

8. The apparatus as claimed in claim 1, wherein a rotation axis (D) of the cord-pull drive (21) is spaced in a parallel manner from an imaginary symmetry axis (S) of the holding-operating element (13) and from a central axis (A) of the apparatus.

9. The apparatus as claimed in claim 1, wherein each of a rotation axis (D) of the cord-pull drive (21) and an imaginary symmetry axis (S) of the holding-operating element (13) is parallel and offset from a central axis (A) of the apparatus.

10. The apparatus as claimed in claim 9, wherein the working unit (4) comprises a bearing element (41) centered on the central axis (A) of the apparatus.

11. The apparatus as claimed in claim 9, wherein the rotation axis (D) of the cord-pull drive (21) is disposed on an opposite side of the central axis (A) from the imaginary symmetry axis (S).

12. The apparatus as claimed in claim 1, further comprising a locking element (10) configured to block the working unit (4) in a non-operational state and an unlocking element configured to actuate the locking element (10) to release the locking element.

13. The apparatus as claimed in claim 12, wherein the locking element (10) comprises a braking means (12) that is part of the working unit (4).

14. The apparatus as claimed in claim 13, wherein the braking means (12) is configured as an external toothing of the working unit (4), and the locking element (10) engages the external toothing, wherein the locking element (10) comprises a hook-shaped element which is movably mounted.

15. The apparatus as claimed in claim 12, wherein the holding-operating element (13) includes the unlocking element (11), and at least one of the duct (14) or a guide element is equipped for actuating the locking element (10).

16. The apparatus as claimed in claim 1, further comprising a locking element (10) connected to the upper part (1) and configured to block the working unit (4) in a non-operational state, wherein the holding-operating element (13) is insertable into the upper part (1) to release the locking element from the working unit (4).

17. The apparatus as claimed in claim 16, wherein the holding-operating element (13) comprises an unlocking element (11) configured to release the locking element (10).

* * * * *